(12) United States Patent
Yasumoto et al.

(10) Patent No.: US 7,813,055 B2
(45) Date of Patent: Oct. 12, 2010

(54) LIGHT RECEIVER AND FRESNEL LENS USED THEREIN

(75) Inventors: Hideo Yasumoto, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 12/143,872

(22) Filed: Jun. 23, 2008

(65) Prior Publication Data

US 2009/0002848 A1    Jan. 1, 2009

(30) Foreign Application Priority Data

Jun. 26, 2007    (JP)    ............... 2007-167136

(51) Int. Cl.
G02B 3/08    (2006.01)
(52) U.S. Cl. .................... 359/742
(58) Field of Classification Search .......... 359/742, 359/743
See application file for complete search history.

(56) References Cited

U.S. PATENT DOCUMENTS

| 4,717,821 | A | * | 1/1988 | Messiou | ............ | 250/221 |
| 4,772,797 | A | * | 9/1988 | Kahl et al. | ............ | 250/353 |
| 4,883,341 | A | * | 11/1989 | Whitehead | ............ | 359/601 |
| 5,404,869 | A | * | 4/1995 | Parkyn et al. | ............ | 126/699 |
| 5,801,889 | A | * | 9/1998 | Meyers et al. | ............ | 359/743 |
| 6,046,847 | A | * | 4/2000 | Takahashi | ............ | 359/457 |

FOREIGN PATENT DOCUMENTS

JP    2006-177999    7/2006
WO   2006-043567    4/2006

OTHER PUBLICATIONS

Hideo Yasumoto, Tomoaki Ieda, Hiroyuki Sasai, and Masaru Fuse; "Study of miniaturization of optical system for 1 Gbps optical wireless receiver"; IEICE General Conference 2007.
Hideo Yasumoto, Tomoaki Ieda, Hiroyuki Sasai, and Masaru Fuse; "Study of optical design with Fresnel lenses for optical wireless communication system"; IEICE Electronics Society Conference 2006.

* cited by examiner

Primary Examiner—Darryl J Collins
(74) Attorney, Agent, or Firm—Pearne & Gordon LLP

(57) ABSTRACT

A light receiver comprises a Fresnel lens for collecting light signals, and a light receiving element disposed closer to the Fresnel lens than the focal point of the Fresnel lens for receiving the light signals collected by the Fresnel lens. The Fresnel lens comprises a lens surface group having a plurality of lens surfaces, and a back cut surface group having a plurality of back cut surfaces connecting the lens surfaces. The back cut surfaces are inclined with respect to the center axis of the Fresnel lens. Thus, the light receiver has a high light collection efficiency of light signals incident within a certain acceptance angle.

4 Claims, 12 Drawing Sheets

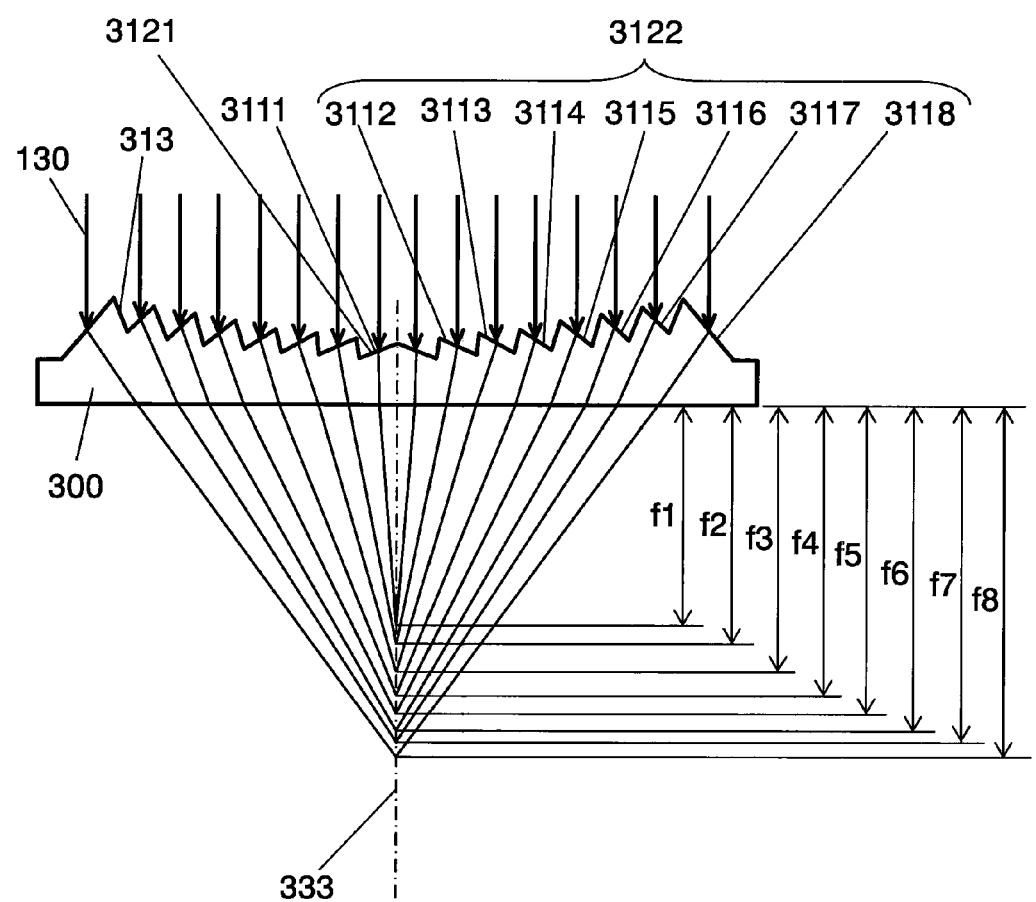

LIGHT RECEIVER AND FRESNEL LENS USED THEREIN

BACKGROUND OF THE INVENTION

1. Field of the Invention

The present invention relates to a light receiver which receives light signals transmitted through space, and to a Fresnel lens used in the light receiver.

2. Background Art

In recent years, mobile terminals typified by mobile telephones are becoming increasingly sophisticated, allowing the user to view large volumes of contents such as moving pictures on the terminals. Such large volumes of data are conventionally transferred to terminals by wired transmission. However, wired transmission is not user-friendly partly because it requires cable connection. To overcome the disadvantages of wired transmission, wireless transmission technologies such as wireless LAN have rapidly come into widespread use. Furthermore, the next generation high-speed wireless transmission technologies such as UWB (Ultra Wide Band) using electromagnetic waves have been actively developed. Optical wireless transmission systems also have been drawing attention.

The optical wireless transmission systems have the potential of providing high-speed performance by utilizing the broad bandwidth of light and of improving communication security by utilizing such characteristics that light moves straight and is blocked by an obstacle. However, the conventional high-speed optical wireless transmission device uses an optical-axis adjusting mechanism to ensure received optical power, thereby having a lot of requirements such as the large size. On the other hand, the high-speed optical wireless transmission device must be compact so that it can be mounted on the mobile terminal such as the mobile telephone. In addition, in order to make the mobile terminal more user-friendly by not forcing the user to perform the optical axis adjustment, the light receiver used in the high-speed optical wireless transmission device is required to have a large acceptance angle. Under such circumstances, there is a need for a light receiver having sufficient light receiving characteristics when light is diagonally incident on the receiving optical system. The acceptance angle means the angle of incidence of light signals within which the light receiver can receive the light signals.

Two types of optical-axis adjusting mechanisms, mechanical type and optical type, are known to make a light receiver have a large acceptance angle. The light receiver having the mechanical optical-axis adjusting mechanism performs the optical axis adjustment by moving a lens as a component of the light receiver, or an optical component such as a light receiving element, or the light receiver itself. The light receiver having an optical optical-axis adjusting mechanism, on the other hand, is formed of a plurality of optical components such as a reflecting mirror and a condenser lens. However, the mechanical optical-axis adjusting mechanism requires a mechanical component such as a motor for driving other components and a peripheral component such as a control circuit for controlling the movements of other components. The optical optical-axis adjusting mechanism, on the other hand, requires an optical component for optical axis adjustment in addition to the lens. Thus, unfortunately, the light receivers using these conventional optical-axis adjusting mechanisms are large in size and expensive.

As a technique to realize a small optical system and a large acceptance angle, a receiving optical system using a Fresnel lens is known. FIGS. 11A to 11C show a conventional light receiver 802 using a Fresnel lens.

As shown in FIG. 11A, a light receiver 802 is constructed by a Fresnel lens 800 (hereinafter, lens 800) and a light receiving element 810. The lens 800 has lens surfaces 811 and back cut surfaces 812.

The lens 800 has a problem of lens loss due to its prismatic shape. More specifically, as shown in FIG. 11B, light signals 820b among the light signals incident on the lens surfaces 811 are collected by the lens 800, but light signals 820a are not collected because they are scattered by the back cut surfaces 812. In this case, all of the light signals 820a incident on the regions shown by bold lines 822a inside the lens surfaces 811 become scattered light and are not collected. Therefore, the regions shown by bold lines 822a are the invalid regions of the lens surfaces 811.

On the other hand, as shown in FIG. 11C, when the incident light on the lens 800 is inclined with respect to the optical axis of the lens 800, the height of the back cut surfaces 812 prevents the light signals outside the light signals 820d from being incident on the lens surfaces 811. Further, the light signals 820c are scattered by the back cut surfaces 812 and cannot be collected. In this case, the regions shown by bold lines 822b and bold lines 822c inside the lens surfaces 811 are the invalid regions of the lens surfaces 811. The configuration of the back cut surfaces 812, which is the cause of the lens loss, depends on the inclination angle of the lens surfaces 811. In other words, as the lens 800 has a shorter focal length, the lens surfaces 811 have a steeper inclination angle, thereby causing the back cut surfaces 812 to have a larger area. As a result, the lens 800 has a larger lens loss.

Thus, the conventional light receiver 802 using the lens 800 has a problem that lens loss occurs in the lens 800 itself.

A light receiver having a low lens loss of a Fresnel lens is disclosed in Patent Document 1 (Japanese Patent Unexamined Publication No. 2006-177999), which is shown in FIGS. 12A and 12B.

As shown in FIGS. 12A and 12B, a light receiver 902 is constructed by a Fresnel lens 900 (hereinafter, lens 900) and a light receiving element 910 disposed at the focal point of the lens 900. In the conventional light receiver 902, the lens 900 has lens surfaces 911 and back cut surfaces 912. The back cut surfaces 912 are inclined with respect to the center axis 913 of the lens 900. As shown in FIG. 12B, the outer lens surfaces 911 have shorter focal lengths. This allows the light beams collected on the light receiving element 910 to have a uniform spot size in the acceptance angle of the light receiver 902.

However, merely inclining the back cut surfaces 912 causes a decrease in the area of the lens surfaces 911, and hence a reduction in the light collection efficiency of the lens 900. On the other hand, if the focal lengths of the outer lens surfaces 911 are reduced to have a uniform spot size of the light beams as in the case of the light receiver 902, the lens loss increases, causing the lens 900 to have a low light collection efficiency.

SUMMARY OF THE INVENTION

The present invention provides a light receiver having a low loss of a Fresnel lens, leading to a high light collection efficiency, and also provides a Fresnel lens used in the light receiver.

A light receiver of the present invention comprises a Fresnel lens for collecting light signals incident thereon; and a light receiving element disposed closer to the Fresnel lens than the focal point of the Fresnel lens. The receiving element receives the light signals collected by the Fresnel lens. The Fresnel lens has a lens surface group having a plurality of lens surfaces, and a back cut surface group having a plurality of back cut surfaces each connecting adjacent two of the lens surfaces. Each of the back cut surfaces is inclined with respect to a center axis of the Fresnel lens.

This structure provides a light receiver which collects light signals from a large acceptance angle on the light receiving element, thereby achieving a high light collection efficiency of light signals incident within a certain acceptance angle.

A Fresnel lens of the present invention is for use in a light receiver which comprises, for receiving light signals transmitted through space, the Fresnel lens for collecting light signals incident thereon, and a light receiving element disposed closer to the Fresnel lens than the focal point of the Fresnel lens for receiving the light signals collected by the Fresnel lens. The Fresnel lens comprises a lens surface group having a plurality of lens surfaces, and a back cut surface group having a plurality of back cut surfaces each connecting adjacent two of the lens surfaces. Each of the back cut surfaces is inclined with respect to a center axis of the Fresnel lens.

This structure provides a Fresnel lens suitable for use in a light receiver which collects light signals from a large acceptance angle on the light receiving element, thereby achieving a high light collection efficiency of light signals incident within a certain acceptance angle.

BRIEF DESCRIPTION OF THE DRAWINGS

FIG. 10 is a sectional view of another Fresnel lens used in the light receiver according to the third embodiment of the present invention.

DETAILED DESCRIPTION OF THE INVENTION

First Embodiment

Figure 1A:
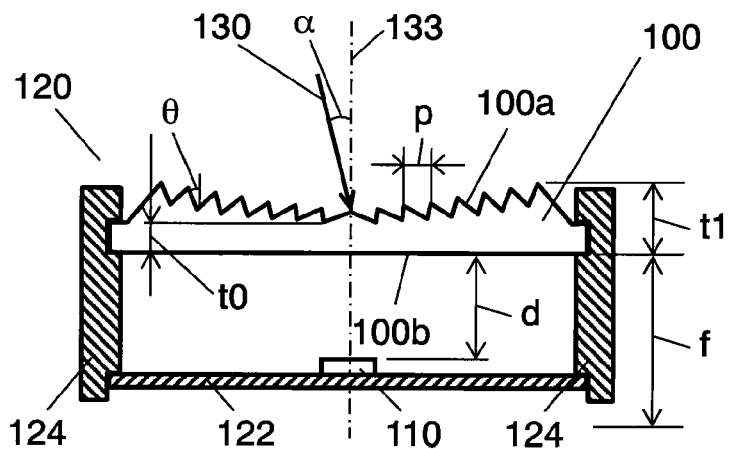
FIG. 1A is a sectional view of a light receiver according to a first embodiment of the present invention.
Figure 1B:
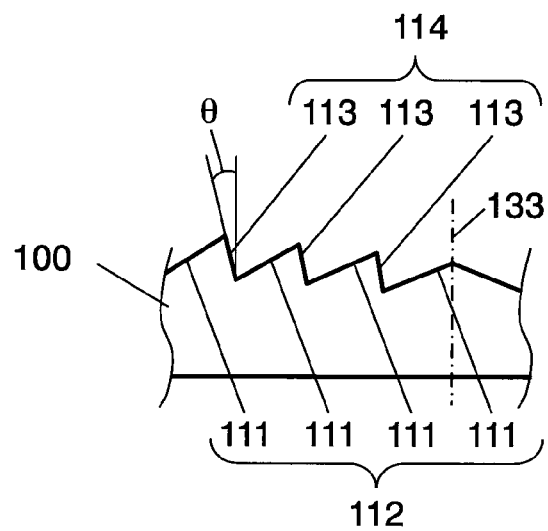
FIG. 1B is a partial sectional view of a Fresnel lens used in the light receiver of FIG. 1A.
Figure 1C:
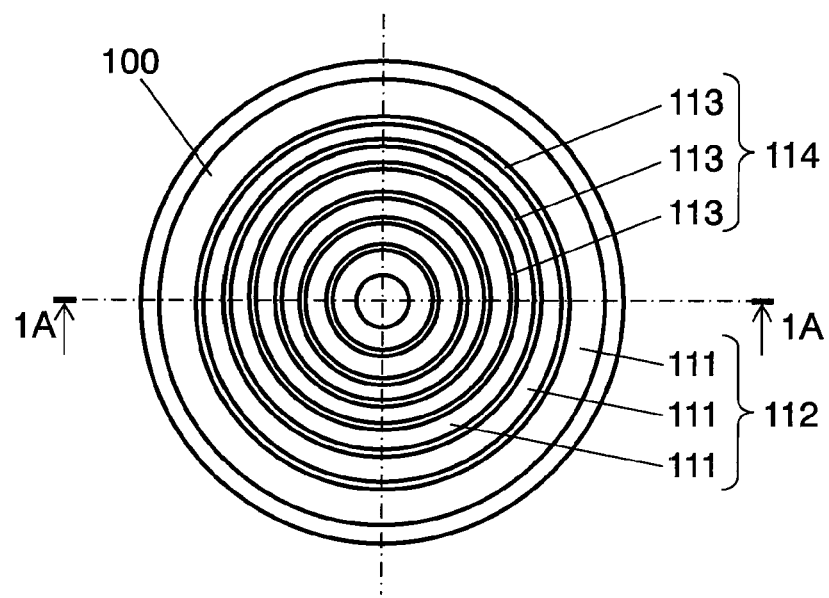
FIG. 1C is a plan view of the Fresnel lens of FIG. 1A when seen from the entrance surface side.
Figure 2:
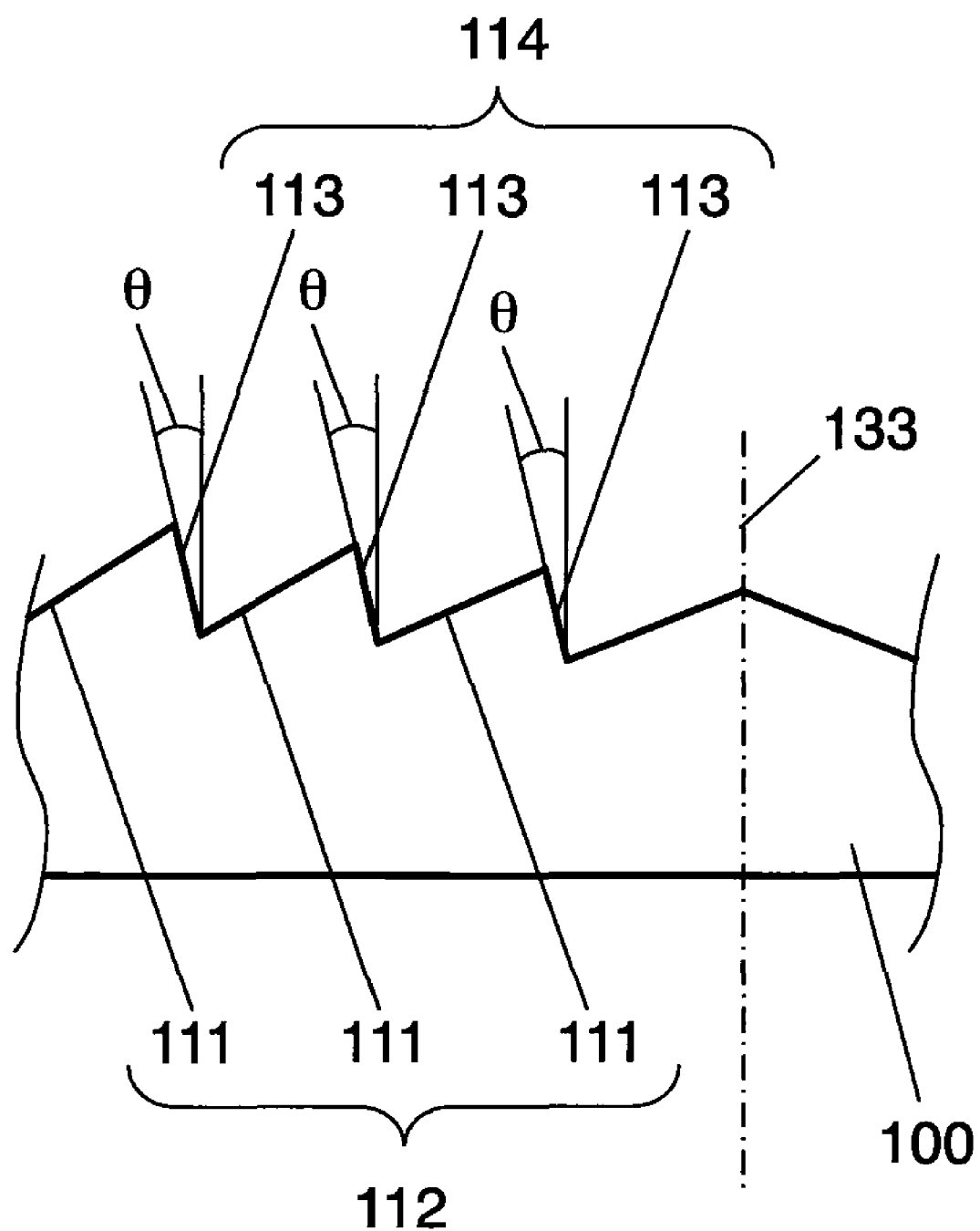
FIG. 2 is a partial sectional view of the Fresnel lens of FIG. 1A.
Figure 3A:
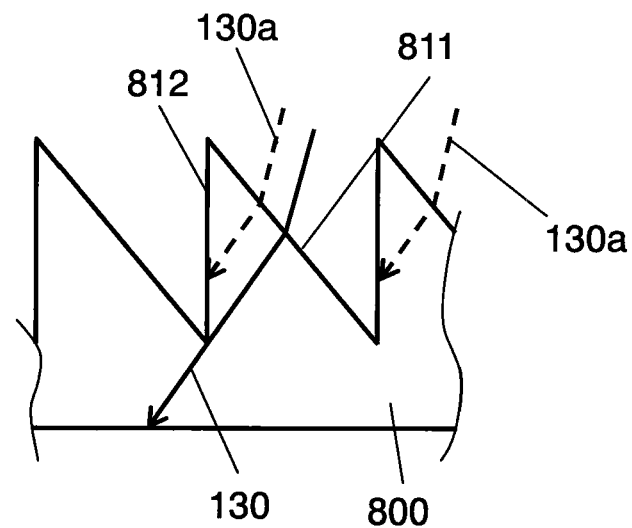
FIG. 3A is a diagram showing the behavior of light signals incident on a conventional Fresnel lens.
Figure 3B:
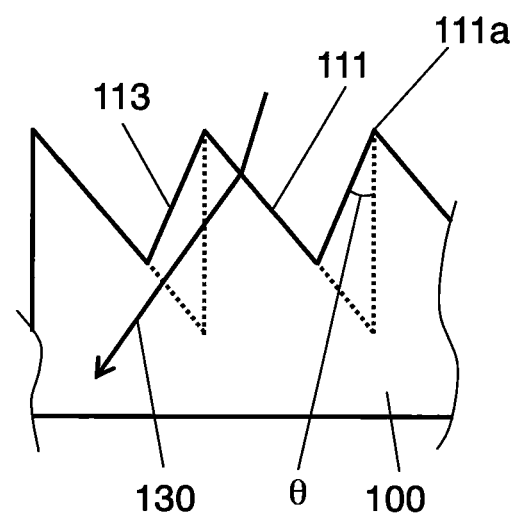
FIG. 3B is a diagram showing a behavior of light signals incident on the Fresnel lens of FIG. 1A.
Figure 3C:
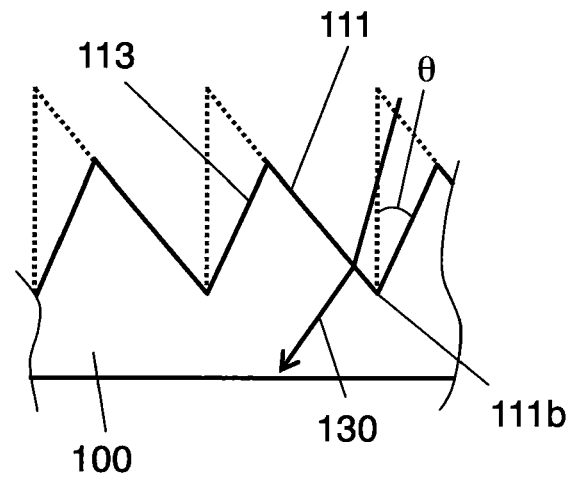
FIG. 3C is a diagram showing another behavior of light signals incident on the Fresnel lens of FIG. 1A.

A light receiver 120 of a first embodiment according to the present invention will be described as follows with reference to the drawings. FIG. 1A is a sectional view of a light receiver 120. FIG. 1B is a partial sectional view of a Fresnel lens 100 (hereinafter, lens 100) used in the light receiver 120 of FIG. 1A. FIG. 1C is a plan view of the lens 100 of FIG. 1A when seen from the entrance surface 100a side. FIG. 2 is a sectional view showing the inclination angle θ of back cut surfaces 113 of the lens 100. FIG. 3A is a diagram showing a behavior of light signals 130 incident on the conventional Fresnel lens 800. FIGS. 3B and 3C are diagrams showing behaviors of light signals 130 incident on the lens 100. FIGS. 4A to 4D are diagrams showing behaviors of the light signals 130 incident on the lens 100.

As shown in FIG. 1A, the light receiver 120 comprises the lens 100, a light receiving element 110 (hereinafter, element 110), a substrate 122, and a holder 124. The lens 100 is a prismatic optical lens whose surface consists of the lens surfaces 111 and the back cut surfaces 113. The lens having such a shape is generally called Fresnel lens. The lens 100 is a planar, thin, and lightweight lens with the optical properties of a convex lens. The lens 100 further has a high degree of freedom in processing the lens surfaces 111 and determining the inclination angle thereof. This allows the lens 100 to have a high NA without being made of high reflective index material.

The light signals 130, which are light beams, are incident on the lens 100 through the entrance surface 100a, collected by the lens 100, and then received by the element 110. The element 110 is mounted on the substrate 122 formed, for example, of an electric circuit board. The substrate 122 has mounted thereon an electric signal processing circuit (not shown) for processing electric signals outputted from the element 110 and other components. The holder 124 holds the lens 100 and the substrate 122 so as to maintain the positional relationship between the lens 100 and the element 110. The holder 124 is made of a molded resin.

As shown in FIG. 1B, the lens 100 has a lens surface group 112 and a back cut surface group 114 on the entrance surface 100a side. The lens surface group 112 consists of a plurality of lens surfaces 111. The back cut surface group 114 consists of a plurality of back cut surfaces 113 each of which connects adjacent two of the lens surfaces 111.

As shown in FIG. 1A, the light signals 130 are incident on the lens 100 at an angle of incidence a with respect to the center axis 133 (the angle of incidence 0°) of the lens 100. The lens surfaces 111 are arranged at a pitch p. The lens 100 has a thickness t and a back focal length f. A distance d denotes the distance from the exit surface 100b of the lens 100 to the element 110.

As shown in FIG. 1B, the back cut surfaces 113 are inclined at an inclination angle θ. The inclination angle θ is the angle at which each of the back cut surfaces 113 is inclined with respect to the center axis 133 of the lens 100. As shown in FIG. 1C, the lens surfaces 111 and the back cut surfaces 113 are arranged alternately and concentrically with respect to the center of the lens 100.

The thickness of the lens 100 increases from the center to the outer periphery as shown in FIG. 1A. That is, the lens 100 has a minimum thickness t0 at the center, and a maximum thickness t1 at the outer periphery. The element 110 is disposed closer to the lens 100 than the focal point of the lens 100. In other words, the lens 100 and the element 110 are disposed to satisfy the relation d<f as shown in FIG. 1A. The focal point of the lens 100 is apart from the exit surface 100b of the lens 100 by the back focal length f of the lens 100. The lens surfaces 111 of the lens surface group 112 are formed in such a manner that the light signals 130 incident at an angle of incidence 0° are collected at the position of the back focal length f, or the focal point, of the lens 100.

As shown in FIG. 2, the back cut surfaces 113 have a uniform inclination angle θ. When the light receiver 120 is assumed to have a maximum acceptance angle amax, the inclination angle θ is set to 2amax or less. In other words, there is a relation of θ≦2amax. FIG. 2 shows only some of the back cut surfaces 113 of the lens 100, but all back cut surfaces 113 of the lens 100 have the uniform inclination angle θ.

The configuration of the back cut surfaces 113 of the lens 100 will be described in detail as follows with reference to FIGS. 3A to 3C. FIG. 3A shows the conventional Fresnel lens 800, which has back cut surfaces 812 with no inclination and substantially parallel to the center axis of the Fresnel lens 800. FIG. 3B shows the lens 100 of the first embodiment according to the present invention in which the back cut surfaces 113 have inclination formed from the top side 111a of the lens surfaces 111. The broken lines indicate the shapes of the back cut surfaces 113 and the lens surfaces 111 supposing that the inclination were not provided. FIG. 3C shows the lens 100 of the first embodiment according to the present invention in which the back cut surfaces 113 have inclination formed from the bottom side 111b of the lens surfaces 111. The broken lines indicate the shapes of the back cut surfaces 113 and the lens surfaces 111 supposing that the inclination were not provided.

In FIG. 3A, the light signals 130 are collected, but the light signals 130a are not collected because they are scattered by the back cut surfaces 812. In FIG. 3B, on the other hand, in the lens 100 of the first embodiment according to the present invention, the back cut surfaces 113 are inclined to prevent the light signals 130 from being scattered by the back cut surfaces 113, thereby allowing more amount of light signals 130 to be collected. Thus, as compared with the lens 800 of FIG. 3A, the lens 100 has a high light collection efficiency of the light signals 130 having a certain angle of incidence. In FIG. 3C, the lens 100 of the first embodiment according to the present invention has the back cut surfaces 113 having an inclination so that the light signals 130 are incident on the lens 100 without being scattered by the back cut surfaces 113. Thus, as compared with the lens 800 of FIG. 3A, the lens 100 has a high light collection efficiency of the light signals 130 having a certain angle of incidence in the same manner as in FIG. 3B.

The behaviors of the light signals 130 incident on the lens 100 at different angles of incidence from each other will be described as follows with reference to FIGS. 4A to 4D.

Figure 4A:
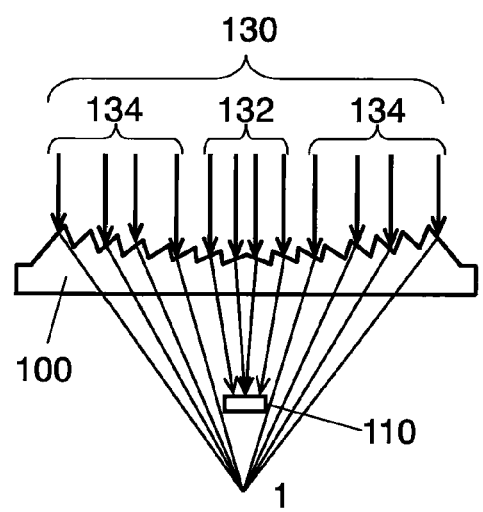
FIG. 4A is a diagram showing a behavior of light signals incident on the Fresnel lens of FIG. 1A.
Figure 4B:
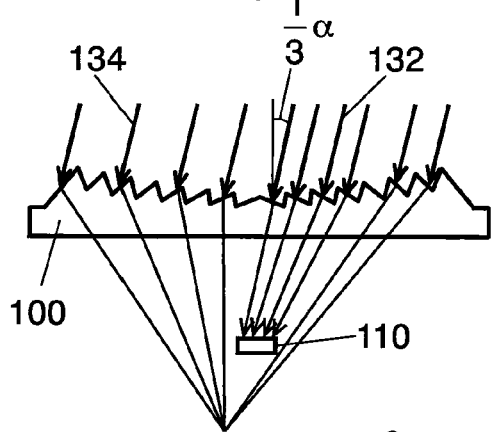
FIG. 4B is a diagram showing another behavior of light signals incident on the Fresnel lens of FIG. 1A.
Figure 4C:
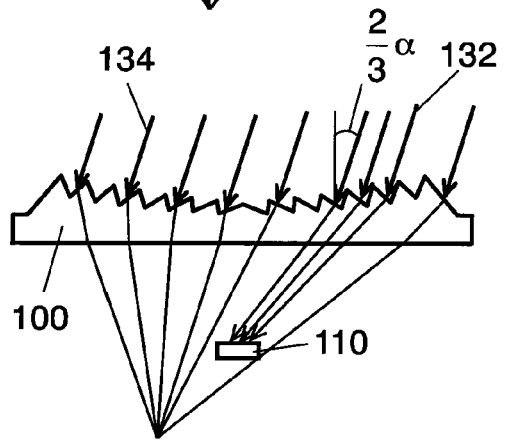
FIG. 4C is a diagram showing another behavior of light signals incident on the Fresnel lens of FIG. 1A.
Figure 4D:
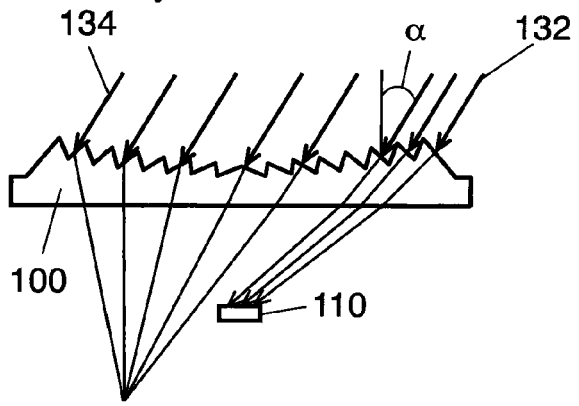
FIG. 4D is a diagram showing another behavior of light signals incident on the Fresnel lens of FIG. 1A.

In FIGS. 4A to 4D, the light signals 130 incident on the lens 100 are divided into light signals 132 which are received by the element 110 and light signals 134 which are not received by the element 110. FIG. 4A shows the behavior of the light signals 130 having an angle of incidence 0° (that is, parallel to the center axis 133). FIGS. 4B, 4C, and 4D show the behaviors of the light signals 130 having angles of incidence ⅓×a°, ⅔×a°, and a°, respectively.

In the light receiver 120 of the first embodiment according to the present invention, the element 110 is disposed closer to the lens 100 than the focal point of the lens 100. This allows some part of the light signals 130 incident on the lens 100 to be collected on the element 110. As the angle of incidence becomes larger as shown from FIG. 4A to FIG. 4D, the light signals 132 incident on the outer lens surfaces 111 of the lens surface group 112 of the lens 100 are collected on the element 110. In the case where the element 110 is disposed closer to the lens 100 than the focal point of the lens 100 in this manner, the lens 100 has a low light collection efficiency of the light signals 130 having an angle of incidence 0° because the element 110 can collect only some part of the light signals 132 out of the light signals 130 incident on the lens 100 as shown in FIG. 4A. However, as shown in FIGS. 4B to 4D, the element 110 can collect the light signals 130 having a certain angle of incidence as the light signals 132 by being disposed closer to the lens 100 than the focal point of the lens 100. In this manner, the element 110 can receive the light signals 132 having large angles of incidence by being disposed closer to the lens 100 than the focal point of the lens 100.

Figure 5A:
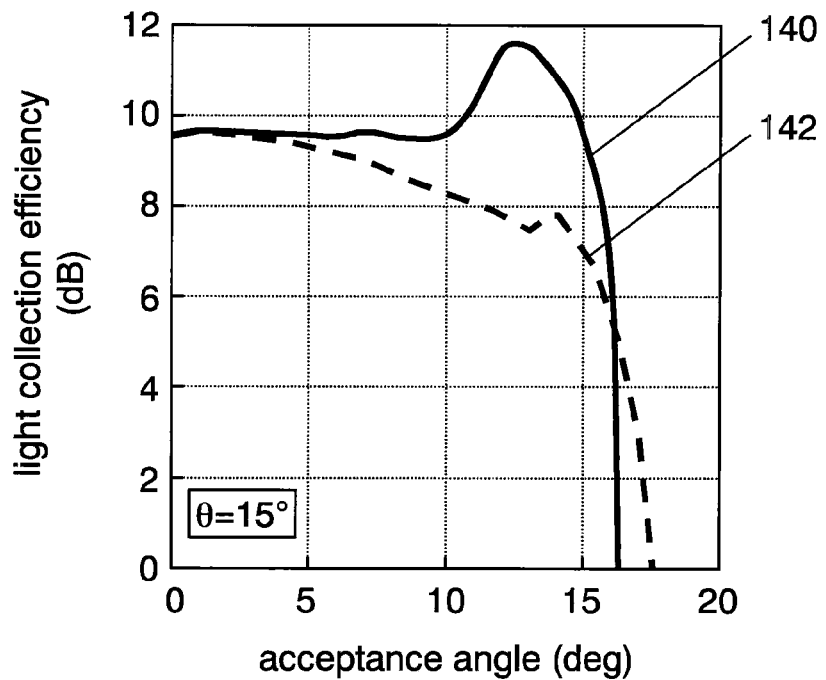
FIG. 5A is a characteristic diagram showing the acceptance angle dependence of light collection efficiency of the light receiver of FIG. 1A.
Figure 5B:
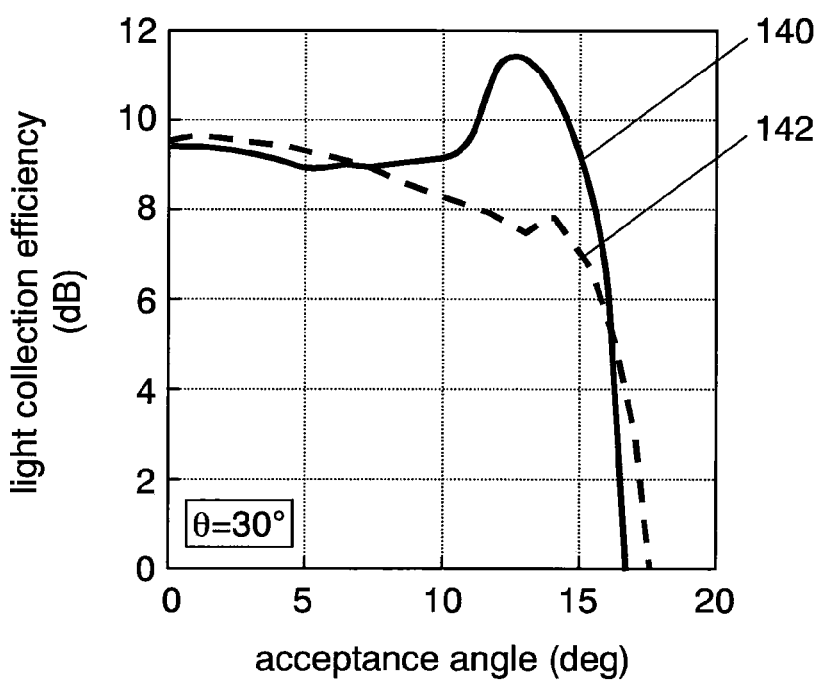
FIG. 5B is a characteristic diagram showing the acceptance angle dependence of light collection efficiency of the light receiver of FIG. 1A.

The following is a description, with reference to FIGS. 5A and 5B, of the relation between the acceptance angle (also referred to as the angle of incidence) of the light signals 130 incident on the lens 100 and the light collection efficiency of the element 110. In FIGS. 5A and 5B, the solid line 140 represents an example of the acceptance angle dependence of the light collection efficiency in the lens 100 of the first embodiment according to the present invention. Broken line 142 represents an example of the acceptance angle dependence of the light collection efficiency in a Fresnel lens whose back cut surfaces are not inclined. The light collection efficiency is expressed in a ratio between the intensity of light signals to be received by the element 110 using a regular convex lens instead of a Fresnel lens and the intensity of the light signals 130 to be received by the element 110 using a Fresnel lens.

The lens 100 and the Fresnel lens whose back cut surfaces are not inclined, which are used to draw the properties shown in FIGS. 5A and 5B, are characterized by the following optical parameters:

lens diameter: 8.0 mm,
maximum lens thickness t1: 1.0 mm,
lens surface pitch p: 0.05 mm, and
back focal length f: 2.0 mm.

The light receiving element 110 has a light-receiving diameter of 0.5 mm, and the light signals 130 have a wavelength of 850 nm. The back cut surfaces 113 of the lens 100 have an inclination angle θ of 15° in FIG. 5A and 30° in FIG. 5B. The distance d to the element 110 from the exit surface of the Fresnel lens whose back cut surfaces are not inclined is 1.075 mm. The distance d to the element 110 from the exit surface of the lens 100 is 1.25 mm in FIG. 5A and 1.225 mm in FIG. 5B. The element 110 is disposed closer to the lens than the focal point both in the lens 100 and the Fresnel lens whose back cut surfaces are not inclined.

In both FIGS. 5A and 5B, the distance d from the exit surface 100b of the lens 100 to the element 110 is determined so that the minimum value of the light collection efficiency of the element 110 becomes maximum when the light signals 130 have angles of incidence a in the range of ±15° (that is, a≦±15°) if the maximum acceptance angle amax of the light receiver 120 is assumed to be ±15°.

In FIGS. 5A and 5B, in the case of the Fresnel lens whose back cut surfaces are not inclined, as the acceptance angle is larger, the scattering loss at the back cut surfaces increases and the light collection efficiency decreases. In the case of the lens 100, on the other hand, the inclined back cut surfaces 113 allow to reduce the scattering loss due to the large acceptance angle. As a result, the lens 100 has a substantially high light collection efficiency of the light signals 130 incident around the assumed maximum acceptance angle amax of ±15°.

As described hereinbefore, in the light receiver 120 of the first embodiment, the Fresnel lens 100 with the inclined back cut surfaces 113 has a high light collection efficiency especially of the light signal 130 having an angle of incidence a.

As described with FIGS. 4A to 4D, only some part of the light signals 130 incident on the lens 100 are collected on the element 110. For further improvement of the light collection efficiency, the lens 100 may preferably have an effective diameter at least twice the size of the light-receiving diameter of the element 110.

The inclination angle θ of the back cut surfaces 113 may not be limited to an integral multiple (15°, 30°) of the maximum acceptance angle amax. Through experience, the inclination angle θ may preferably be 0.7 to 2 times the maximum acceptance angle amax.

The back cut surfaces 113 of the lens 100 have the uniform inclination angle θ throughout the lens 100 as shown in FIG. 2. However, the inclination angle θ of the back cut surfaces may be different in some regions. In addition, the inclination angle θ may increase from the center to the outer periphery of the lens 100 so that the lens 100 can receive the light signals 130 having larger angles of incidence.

The lens surfaces 111 have a linear cross section. However, the lens surfaces may alternatively have a curved cross section such as a convex arc or a non-circular arc.

The lens surface pitch p of the lens surfaces 111 is uniform. However, the pitch of the lens surfaces may alternatively be increased from the center to the periphery of the lens 100. This allows to receive the light signals 130 having larger angles of incidence.

Second Embodiment

A light receiver 120 of a second embodiment according to the present invention will be described as follows with reference to the accompanying drawings. The same components as those of the first embodiment are labeled with the same reference numerals and will not be described again in detail. The light receiver 120 of the second embodiment differs from the light receiver 120 of the first embodiment in that the Fresnel lens has additional features described below.

Figure 6:
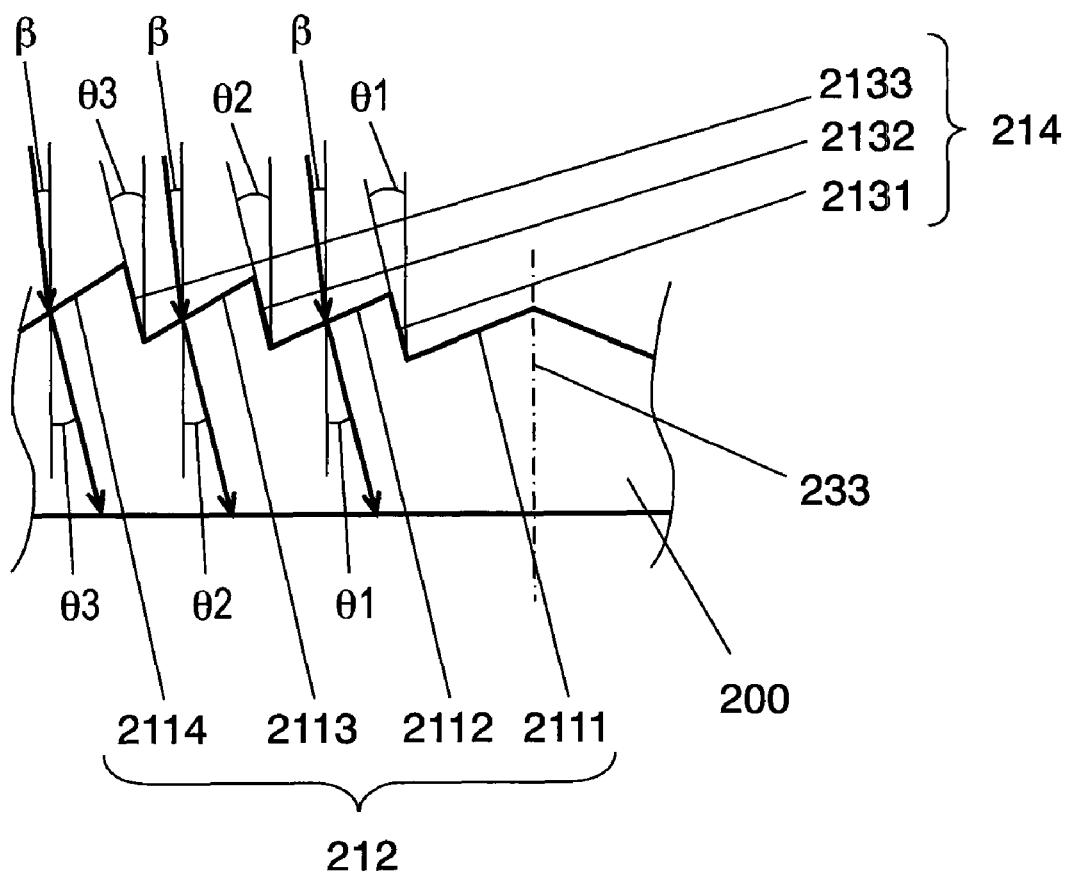
FIG. 6 is a partial sectional view of a Fresnel lens used in a light receiver according to a second embodiment of the present invention.

FIG. 6 is a partial sectional view of the Fresnel lens 200 (hereinafter, lens 200) used for the light receiver 120 of the second embodiment which is not shown in the drawings but has such a structure that the lens 100 of FIG. 1A is replaced by the lens 200. Similarly to the light receiver 120 of the first embodiment, the light receiver 120 of the second embodiment has the light receiving element 110, the substrate 122, and the holder 124.

As shown in FIG. 6, the lens 200 has a lens surface group 212 and a back cut surface group 214. The lens surface group 212 consists of a first lens surface 2111, a second lens surface 2112, a third lens surface 2113, and a fourth lens surface 2114 in this order from the center toward the periphery of the lens 200. The back cut surface group 214 consists of a first back cut surface 2131 (hereinafter, back cut surface 2131), a second back cut surface 2132 (hereinafter, back cut surface 2132), and a third back cut surface 2133 (hereinafter, back cut surface 2133) which are different in the inclination angle from one another. The back cut surface 2131 has a first inclination angle θ1 (hereinafter, angle θ1). The back cut surface 2132 has a second inclination angle θ2 (hereinafter, angle θ2). The back cut surface 2133 has a third inclination angle θ3 (hereinafter, angle θ3). The angle θ1 is nearly equal to the angle of refraction of the second lens surface 2112 when the light signals 130 having a reference angle of incidence β are incident on the second lens surface 2112, which is positioned outside the back cut surface 2131. Similarly, the angle θ2 is nearly equal to the angle of refraction of the third lens surface 2113 when the light signals 130 having the reference angle of incidence β are incident on the third lens surface 2113, which is positioned outside the back cut surface 2132. The angle θ3 is nearly equal to the angle of refraction of the fourth lens surface 2114 when the light signals 130 having the reference angle of incidence β are incident on the fourth lens surface 2114, which is positioned outside the back cut surface 2133. The reference angle of incidence β and the angles θ1, θ2 and θ3 are defined with respect to the center axis 233 of the lens 200.

As described above, the lens 200 has the back cut surfaces 2131, 2132 and 2133 having the different angles θ1, θ2 and θ3, respectively. The relation between the acceptance angle of the light signals 130 incident on the lens 200 and the light collection efficiency of the element 110 will be described as follows with reference to FIGS. 7A and 7B.

Figure 7A:
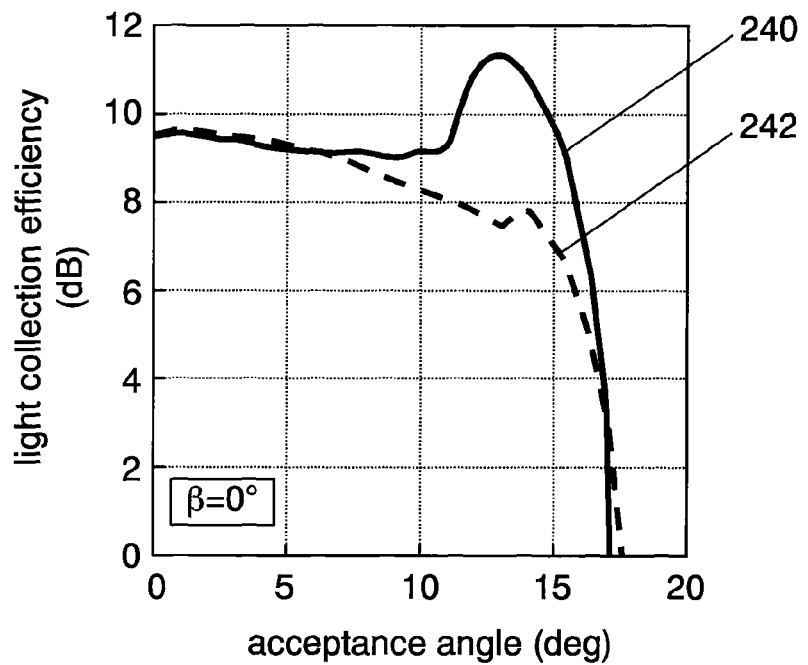
FIG. 7A is a characteristic diagram showing the acceptance angle dependence of light collection efficiency of the light receiver according to the second embodiment of the present invention.
Figure 7B:
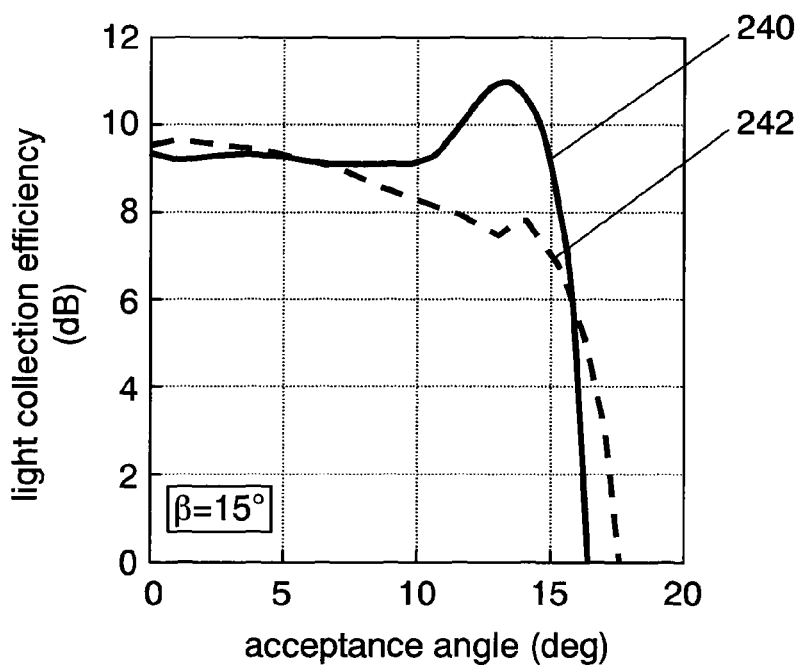
FIG. 7B is a characteristic diagram showing the acceptance angle dependence of light collection efficiency of the light receiver according to the second embodiment of the present invention.

In FIGS. 7A and 7B, the solid line 240 represents an example of the acceptance angle dependence of the light collection efficiency in the lens 200 of the second embodiment. The broken line 242 represents an example of the acceptance angle dependence of the light collection efficiency in a Fresnel lens whose back cut surfaces are not inclined. The light collection efficiency is expressed in a ratio between the intensity of light signals to be received by the element 110 using a regular convex lens instead of a Fresnel lens and the intensity of the light signals 130 to be received by the element 110 using a Fresnel lens.

The lens 200 and the Fresnel lens whose back cut surfaces are not inclined, which are used to draw the properties shown in FIGS. 7A and 7B, are characterized by the following optical parameters:

lens diameter: 8.0 mm,
maximum lens thickness t1: 1.0 mm,
lens surface pitch p: 0.05 mm, and
back focal length f: 2.0 mm.

The light receiving element 110 has a light-receiving diameter of 0.5 mm, and the light signals 130 have a wavelength of 850 nm.

The reference angle of incidence β used to determine the angles θ1, θ2 and θ3 of the back cut surfaces 2131, 2132 and 2133 of the lens 200 is 0° in FIG. 7A and 150 in FIG. 7B. The distance d to the element 110 from the exit surface of the Fresnel lens whose back cut surfaces are not inclined is 1.075 mm. The distance d to the element 110 from the exit surface of the lens 200 is 1.225 mm in both FIGS. 7A and 7B. The element 110 is disposed closer to the lens than the focal point for both the lens 200 and the Fresnel lens whose back cut surfaces are not inclined.

In both FIGS. 7A and 7B, the distance d from the exit surface 100b of the lens 200 to the element 110 is determined so that the minimum value of the light collection efficiency of the element 110 becomes maximum when the light signals 130 have angles of incidence a in the range of ±15° (that is, a≦±15°) if the maximum acceptance angle amax of the light receiver 120 is assumed to be ±15°.

In FIGS. 7A and 7B, in the case of the Fresnel lens whose back cut surfaces are not inclined, as the acceptance angle is larger, the scattering loss at the back cut surfaces increases and the light collection efficiency decreases. In the case of the lens 200, on the other hand, the inclined back cut surfaces 2131, 2132 and 2133 allow to reduce the scattering loss due to the large acceptance angle. As a result, the lens 200 has a substantially high light collection efficiency of the light signals 130 incident around the assumed maximum acceptance angle amax of ±15°.

As described hereinbefore, in the light receiver 120 of the second embodiment, the Fresnel lens 200 of the embodiment has the back cut surfaces 2131, 2132 and 2133 inclined at different angles θ1, θ2 and θ3, respectively. This results in a high light collection efficiency especially of the light signals 130 having the angle of incidence a.

The reference angle of incidence β used to determine the angles θ1, θ2 and θ3 of the back cut surfaces 2131, 2132 and 2133 may not be limited to 0° or 15°, but may within the value of the assumed maximum acceptance angle amax.

The angles θ1, θ2 and θ3 of the back cut surfaces 2131, 2132, and 2133 are determined based on the uniform reference angle of incidence β in the above description, but may alternatively be determined based on different reference angles of incidence β for each back cut surface. Furthermore, the reference angle of incidence β may be increased from the center to the periphery of the lens 200.

The back cut surface group 214 described above includes the first, second and third back cut surfaces 2131, 2132 and 2133 having different angles θ1, θ2 and θ3, respectively. However, the back cut surface group 214 does not necessarily consist of three back cut surfaces, but may consist of a plurality of back cut surfaces having different inclination angles θ from one another. The values of the inclination angles θ may be determined according to the structure of the light receiver 120 in which the lens 200 is used. Thus, the back cut surface group 214 may have a plurality of back cut surfaces having two or more different inclination angles θ respectively to obtain the action and effect equivalent to those in the case of having the back cut surfaces 2131, 2132 and 2133.

Third Embodiment

Figure 8A:
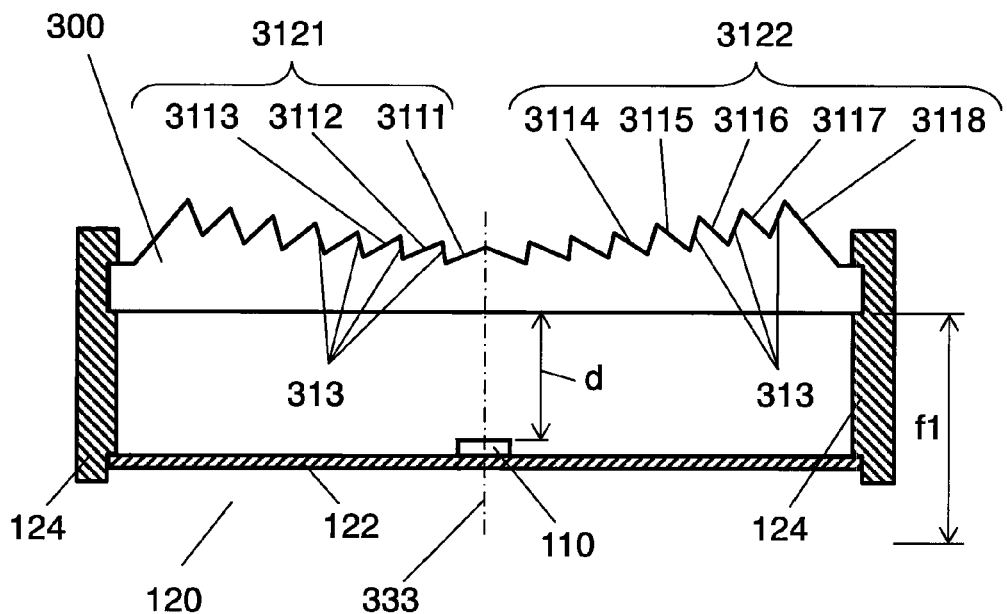
FIG. 8A is a sectional view of a light receiver according to a third embodiment of the present invention.
Figure 8B:
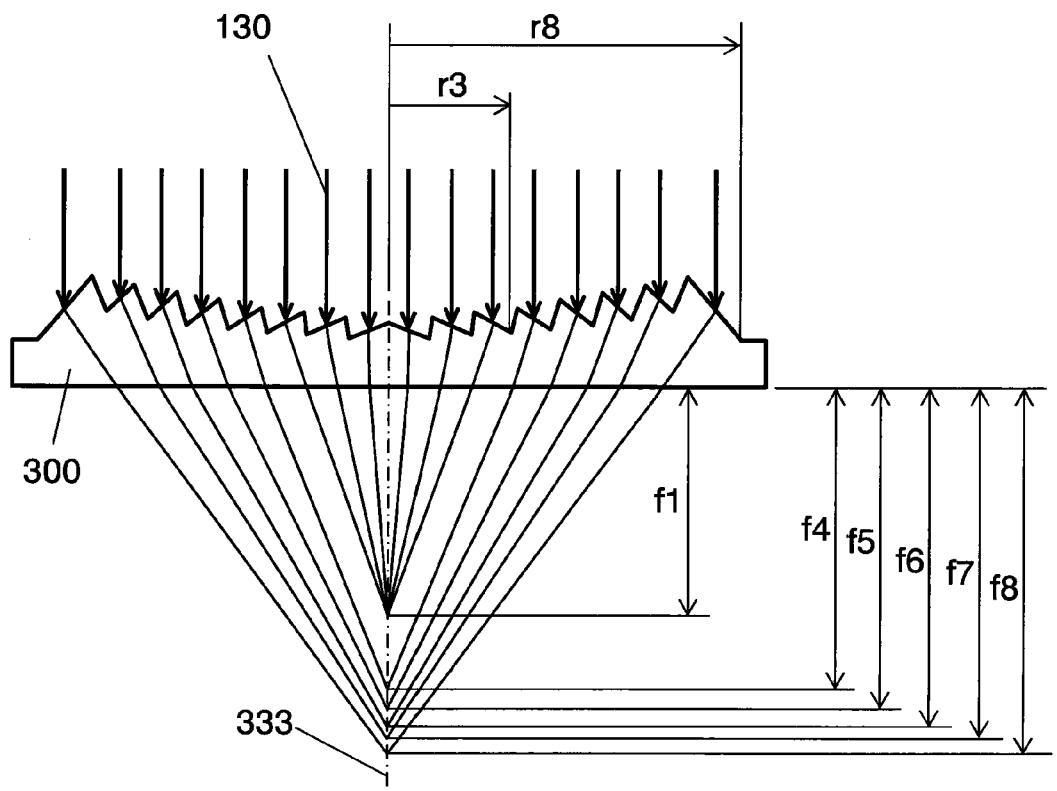
FIG. 8B is a sectional view of the Fresnel lens shown in FIG. 8A.

A light receiver 120 of a third embodiment according to the present invention will be described as follows with reference to the accompanying drawings. The same components as those of the first and second embodiments are labeled with the same reference numerals and will not be described again in detail. The light receiver 120 of the third embodiment differs from the light receivers 120 of the first and second embodiments in that the Fresnel lens has additional features described below. FIG. 8A is a sectional view of the light receiver 120 of the third embodiment. FIG. 8B is a sectional view of a Fresnel lens 300 (hereinafter, lens 300) of FIG. 8A.

As shown in FIG. 8A, the light receiver 120 comprises the lens 300, the light receiving element 110, the substrate 122, and the holder 124. The lens 300 has a first lens surface group 3121 and a second lens surface group 3122. The first lens surface group 3121 consists of a first lens surface 3111, a second lens surface 3112 and a third lens surface 3113 in this order from the center to a mid of the lens 300. The second lens surface group 3122 consists of a fourth lens surface 3114, a fifth lens surface 3115, a sixth lens surface 3116, a seventh lens surface 3117 and an eighth lens surface 3118 in this order from the mid to the periphery of lens 300. The fourth lens surface 3114 has a focal point at the end of the back focal length f4. Similarly, the fifth, sixth, seventh and eighth lens surfaces 3115, 3116, 3117 and 3118 have the focal points at the ends of the back focal lengths f5, f6, f7 and f8, respectively.

As shown in FIG. 8B, the first, second and third lens surface 3111, 3112 and 3113 of the first lens surface group 3121 have a uniform back focal length f1. On the other hands, the fourth to eighth lens surfaces 3114, 3115, 3116, 3117 and 3118 of the second lens surface group 3122 have the back focal lengths f4, f5, f6, f7 and f8, which increase toward the periphery of the lens 300. The focal lengths of the lens surfaces are in the relation of f1<f4<f5<f6<f7<f8.

Thus, the lens 300 has a plurality of focal points, and the element 110 is disposed closer to the lens 300 than the focal point that is closest to the lens 300. In other words, the lens 300 and the element 110 are disposed to satisfy the relation of d<f1 as shown in FIG. 8A.

The back cut surfaces 313 inside the lens surfaces 3112, 3113, 3114, 3115, 3116, 3117 and 3118 are inclined at different inclination angles θ with respect to the center axis 333. As described in the second embodiment, the inclination angles θ are set to be approximately equal to the angles of refraction when the light signals 130 having a reference angle of incidence β are incident on the lens surfaces 3112, 3113, 3114, 3115, 3116, 3117 and 3118.

As described above, the lens 300 has the first lens surface group 3121 consisting of the lens surfaces 3111, 3112 and 3113 having the uniform back focal length f1, and the second lens surface group 3122 consisting of the lens surfaces 3114, 3115, 3116, 3117 and 3118 having the back focal lengths f increasing toward the outer periphery of the lens 300. The following is a description, with reference to FIG. 9, of the relation between the acceptance angle of the light signals 130 incident on the lens 300 and the light collection efficiency of the element 110.

Figure 9:
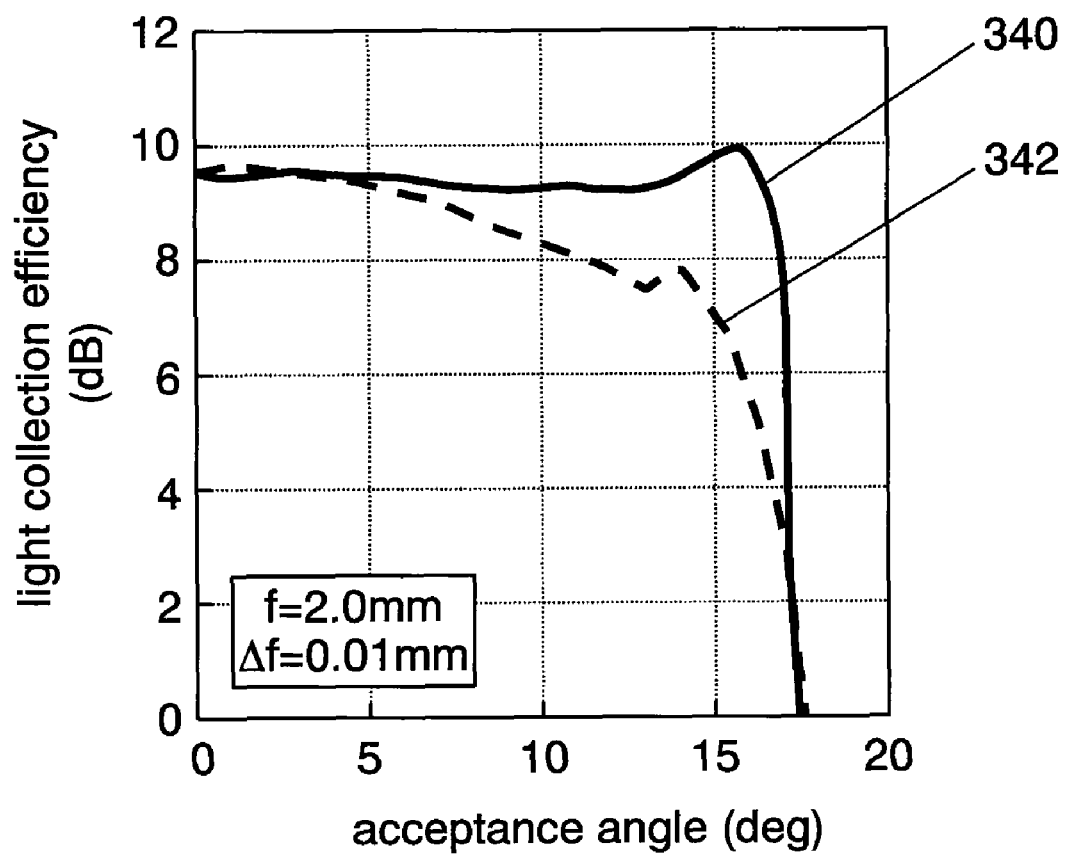
FIG. 9 is a characteristic diagram showing the acceptance angle dependence of light collection efficiency of the light receiver of FIG. 8A.
Figure 11A:
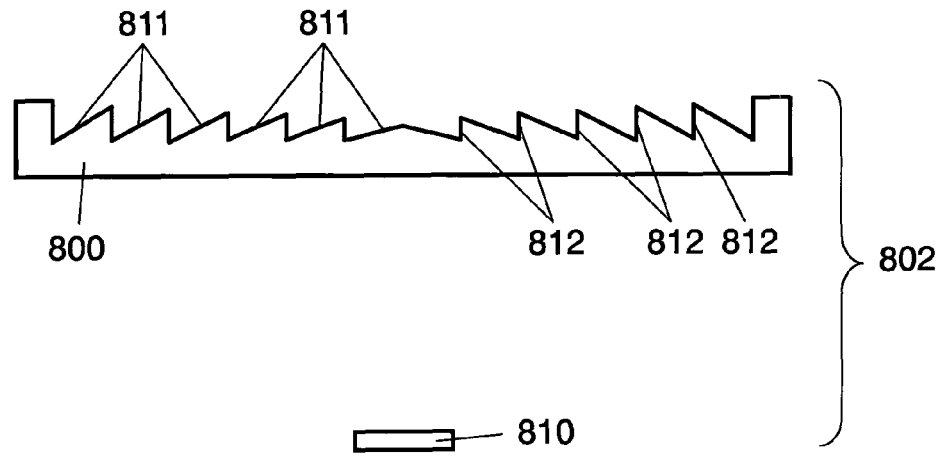
FIG. 11A is a sectional view of a conventional light receiver using a Fresnel lens.
Figure 11B:
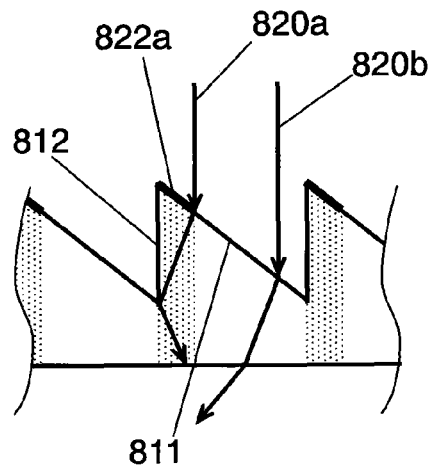
FIG. 11B is a diagram showing a behavior of light signals incident on the Fresnel lens of FIG. 11A.
Figure 11C:
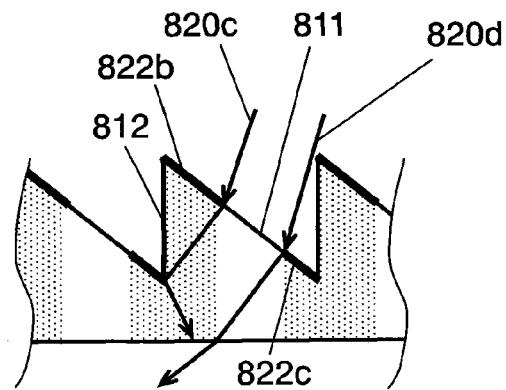
FIG. 11C is a diagram showing another behavior of light signals incident on the Fresnel lens of FIG. 11A.
Figure 12A:
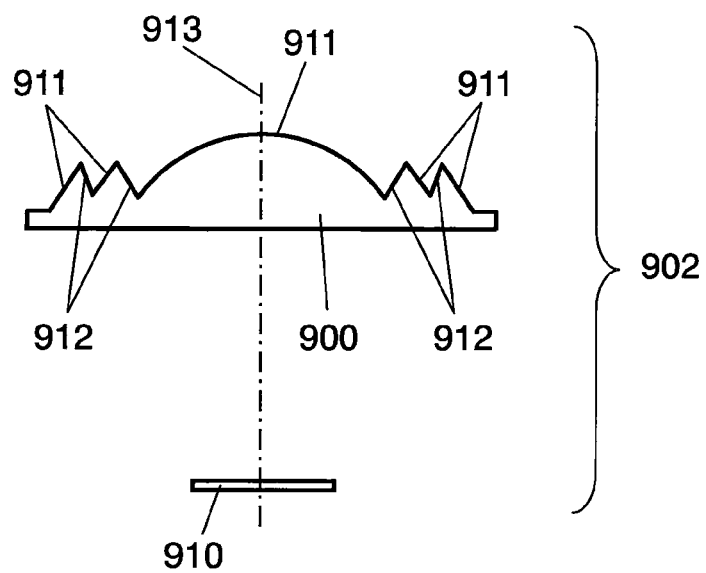
FIG. 12A is a sectional view of a conventional light receiver using a Fresnel lens.
Figure 12B:
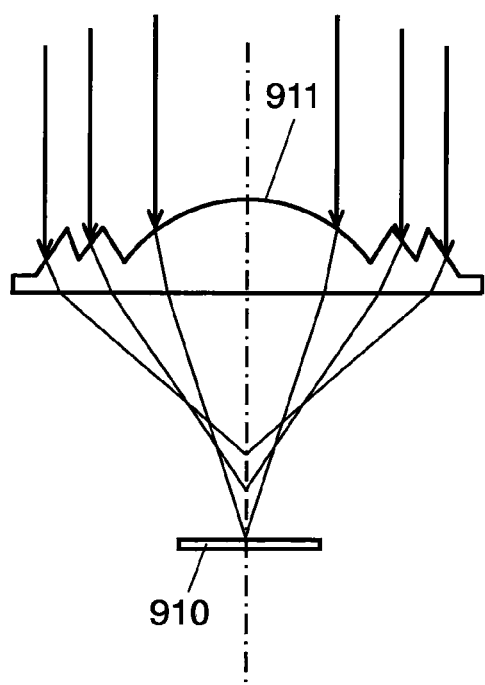
FIG. 12B is a diagram showing a behavior of light signals incident on the Fresnel lens of FIG. 12A.

In FIG. 9, the solid line 340 represents an example of the acceptance angle dependence of the light collection efficiency in the lens 300 of the present embodiment. The broken line 342 represents an example of the acceptance angle dependence of the light collection efficiency in a Fresnel lens whose back cut surfaces are riot inclined. The light collection efficiency is expressed in a ratio between the intensity of the light signal to be received by the element 110 using a convex lens instead of a Fresnel lens and the intensity of the light signals 130 to be received by the element 110 using a Fresnel lens.

The lens 300 and the Fresnel lens whose back cut surfaces are not inclined, which are used to draw the properties shown in FIG. 9, are characterized by the following optical parameters:

lens diameter: 8.0 mm,
maximum lens thickness t1: 1.0 mm,
lens surface pitch p: 0.05 mm, and
minimum back focal length f1: 2.0 mm.

The light receiving element 110 has a light-receiving diameter of 0.5 mm, and the light signals 130 have a wavelength of 850 nm.

The lens 300 is designed to have a minimum back focal length f1 of 2 mm in the range of the radius r less than 2 mm, and a back focal length f increasing by 0.01 mm toward outer lens surfaces in the range of the radius r between 2 mm and 4 mm. In other words, the third lens surface 3113 has an outer peripheral radius r3 of nearly equal to 2 mm, and the eighth lens surface 3118 has an outer peripheral radius r8 of nearly equal to 4 mm. The back focal lengths f4, f5, f6, f7 and f8 are in the relation of f5=f4+0.01, f6=f5+0.01, f7=f6+0.01, and f8=f7+0.01.

The reference angle of incidence β used to determine the inclination angles θ of the back cut surfaces 313 of the lens 300 is 0°. The distance d to the element 110 from the exit surface of the Fresnel lens whose back cut surfaces are not inclined is 1.075 mm. The distance d to the element 110 from the exit surface of the lens 300 is 1.225 mm. The element 110 is disposed closer to the lens than the focal point for both the lens 300 and the Fresnel lens whose back cut surfaces are not inclined.

In FIG. 9, in the case of the Fresnel lens whose back cut surfaces are not inclined, as the acceptance angle is larger, the scattering loss at the back cut surfaces increases and the light collection efficiency decreases. In the case of the lens 300 of the present embodiment, on the other hand, the inclined back cut surfaces 313 allow to reduce the scattering loss due to the large acceptance angle. As a result, the lens 300 has a substantially high light collection efficiency of the light signals 130 incident around the assumed maximum acceptance angle amax of ±15°. In addition, the back focal length f is not uniform, but is increased toward the outer periphery of the lens 300. This reduces the influence of the aberration of the lens 300 on the light signals 130 having a large acceptance angle a, and hence reduces the deviation of the light collection efficiency.

As described hereinbefore, in the light receiver 120 of the third embodiment, the Fresnel lens 300 of the embodiment has the back cut surfaces 313 inclined at different angles. This feature results in a high light collection efficiency especially of the light signals 130 having an angle of incidence a. In addition, the back focal length f is not uniform, but is increased toward the outer periphery of the lens 300. This reduces the influence of the aberration of the lens 300 on the light signals 130 incident within a large acceptance angle, and hence reduces the deviation of the light collection efficiency in the light receiver 120.

The variation width of the back focal length f of the lens surfaces may preferably be determined so that at least the light signals 130 incident on the outermost lens surface 3118 at the assumed maximum acceptance angle amax of the light receiver 120 are received by the light receiving element 110.

The variation width of the back focal length f of the lens surfaces may not be limited to 0.01 mm, but may preferably be determined according to the value of the back focal length f1, which is in the vicinity of the center of the lens 300, or to the light receiving system of the element 110, or to the acceptance angle range of the light receiver 120.

As described above, the lens 300 has the first lens surface group 3121 consisting of the lens surfaces 3111 to 3113 having the uniform back focal length f1, and the second lens surface group 3122 consisting of the lens surfaces 3114 to 3118 having the different back focal lengths f4 to f8, respectively. However, the first lens surface group 3121 does not necessarily consist of the lens surfaces 3111 to 3113 having the uniform back focal length, but may instead consist of at least one lens surface. In short, the lens 300 may, for example, have a configuration as shown in FIG. 10.

The lens 300 shown in FIG. 10 has a first lens surface group 3121 and a second lens surface group 3122. The first lens surface group 3121 consists of only a first lens surface 3111 closest to the center of the lens 300. The lens surface 3111 has a focal point at the end of the back focal length f1. The second lens surface group 3122 consists of second, third, fourth, fifth, sixth, seventh and eighth lens surfaces 3112, 3113, 3114, 3115, 3116, 3117 and 3118 in this order from the center to the outer periphery of the lens 300. The second lens surface 3112 has a focal point at the end of the back focal length f2. Similarly, the third to eighth lens surfaces 3113 to 3118 have focal points at the ends of the back focal lengths f3, f4, f5, f6, f7 and f8, respectively. The back focal lengths f2, f3, f4, f5, f6, f7 and f8 of the lens surfaces 3112, 3113, 3114, 3115, 3116, 3117 and f8 of the second lens surface group 3122 increase toward the outer periphery of the lens 300. In other words, they are in the relation of f1<f2<f3<f4<f5<f6<f7<f8. Thus, the lens 300 shown in FIG. 10 can obtain the action and effects equivalent to those described with reference to FIGS. 8A and 8B.

The reference angle of incidence β used to determine the inclination angles θ of the back cut surfaces 313 may not be limited to 0°, but may be a value within the assumed maximum acceptance angle amax.

The inclination angles θ of the back cut surfaces 313 are determined based on the uniform reference angle of incidence β in the above description, but may alternatively be determined based on different reference angles of incidence β for each back cut surface. Furthermore, the reference angles of incidence β may be increased from the center to the outer periphery of the lens 300.

In the above description, the lens 300 has eight different types of lens surfaces 3111 to 3118, but may instead have other number of types of lens surfaces. The number of types of the lens surfaces may be determined according to the configuration of the light receiver 120 in which the lens 300 is used.

What is claimed is:

1. A light receiver comprising:
   a Fresnel lens for collecting light signals incident thereon; and
   a light receiving element disposed closer to the Fresnel lens than a focal point of the Fresnel lens, the light receiving element receiving the light signals collected by the Fresnel lens, wherein
   the Fresnel lens comprises:
   a lens surface group having a plurality of lens surfaces; and
   a back cut surface group having a plurality of back cut surfaces connecting the lens surfaces,
   the back cut surfaces being inclined with respect to a center axis of the Fresnel lens,
   wherein the lens surface group includes:
   a first lens surface group formed of lens surfaces having a first focal length; and
   a second lens surface group formed of lens surfaces having a second focal length, and wherein
   the first focal length is shorter than the second focal length,
   the first lens surface group is disposed close to a center of the Fresnel lens, and
   the second lens surface group is disposed outside the first lens surface group.

2. A light receiver comprising:
   a Fresnel lens for collecting light signals incident thereon; and a light receiving element disposed closer to the Fresnel lens than a focal point of the Fresnel lens, the light receiving element receiving the light signals collected by the Fresnel lens, wherein the Fresnel lens comprises:
- a lens surface group having a plurality of lens surfaces; and
- a back cut surface group having a plurality of back cut surfaces connecting the lens surfaces,
- the back cut surfaces being inclined with respect to a center axis of the Fresnel lens, wherein the lens surface group includes:
- a first lens surface group disposed in a predetermined range from a center of the Fresnel lens; and
- a second lens surface group disposed outside the first lens surface group,
- the first lens surface group includes a lens surface having a uniform focal length, and
- the second lens surface group includes lens surfaces whose focal lengths increase toward an outer periphery of the Fresnel lens.

3. A Fresnel lens for use in a light receiver for receiving light signals transmitted through space, the light receiver comprising the Fresnel lens for collecting light signals incident thereon, and a light receiving element disposed closer to the Fresnel lens than a focal point of the Fresnel lens for receiving the light signals collected by the Fresnel lens, the Fresnel lens comprising:
- a lens surface group having a plurality of lens surfaces; and
- a back cut surface group having a plurality of back cut surfaces connecting the lens surfaces,
- the back cut surfaces being inclined with respect to a center axis of the Fresnel lens, wherein the lens surface group includes:
- a first lens surface group formed of lens surfaces having a first focal length; and
- a second lens surface group formed of lens surfaces having a second focal length, and wherein
- the first focal length is shorter than the second focal length,
- the first lens surface group is disposed close to a center of the Fresnel lens, and
- the second lens surface group is disposed outside the first lens surface group.

4. A Fresnel lens for use in a light receiver for receiving light signals transmitted through space, the light receiver comprising the Fresnel lens for collecting light signals incident thereon, and a light receiving element disposed closer to the Fresnel lens than a focal point of the Fresnel lens for receiving the light signals collected by the Fresnel lens, the Fresnel lens comprising:
- a lens surface group having a plurality of lens surfaces; and
- a back cut surface group having a plurality of back cut surfaces connecting the lens surfaces,
- the back cut surfaces being inclined with respect to a center axis of the Fresnel lens, wherein the lens surface group includes:
- a first lens surface group disposed in a predetermined range from a center of the Fresnel lens; and
- a second lens surface group disposed outside the first lens surface group,
- the first lens surface group includes a lens surface having a uniform focal length; and
- the second lens surface group includes lens surfaces whose focal lengths increase toward an outer periphery of the Fresnel lens.

* * * * *

UNITED STATES PATENT AND TRADEMARK OFFICE
CERTIFICATE OF CORRECTION

| | | |
|---|---|---|
| PATENT NO. | : 7,813,055 B2 | Page 1 of 1 |
| APPLICATION NO. | : 12/143872 | |
| DATED | : October 12, 2010 | |
| INVENTOR(S) | : Hideo Yasumoto et al. | |

It is certified that error appears in the above-identified patent and that said Letters Patent is hereby corrected as shown below:

In Column 8, line 66 please delete "150" and insert therefor --15°--.

In Column 10, line 53 please delete "riot" and insert therefor --not--.

Signed and Sealed this
Eleventh Day of January, 2011

David J. Kappos
*Director of the United States Patent and Trademark Office*